(12) United States Patent
Stenberg

(10) Patent No.: US 8,230,218 B2
(45) Date of Patent: Jul. 24, 2012

(54) MOBILE STATION AUTHENTICATION IN TETRA NETWORKS

(75) Inventor: Timo Stenberg, Vantaa (FI)

(73) Assignee: Eads Secure Networks Oy, Helsinki (FI)

( * ) Notice: Subject to any disclaimer, the term of this patent is extended or adjusted under 35 U.S.C. 154(b) by 357 days.

(21) Appl. No.: 12/310,851

(22) PCT Filed: Sep. 12, 2007

(86) PCT No.: PCT/FI2007/050485
§ 371 (c)(1),
(2), (4) Date: Mar. 10, 2009

(87) PCT Pub. No.: WO2008/031926
PCT Pub. Date: Mar. 20, 2008

(65) Prior Publication Data
US 2010/0037053 A1 Feb. 11, 2010

(30) Foreign Application Priority Data

Sep. 13, 2006 (FI) ..................................... 20065564
Sep. 19, 2006 (FI) ..................................... 20065572

(51) Int. Cl.
*H04L 9/14* (2006.01)
*H04L 9/32* (2006.01)
*H04L 29/06* (2006.01)
(52) U.S. Cl. ............. 713/168; 726/14; 380/44; 380/259
(58) Field of Classification Search .......................... None
See application file for complete search history.

(56) References Cited

U.S. PATENT DOCUMENTS

| 5,638,448 | A | * | 6/1997 | Nguyen ........................ 380/29 |
| 5,987,325 | A | | 11/1999 | Tayloe | |
| 7,394,900 | B1 | * | 7/2008 | Gerber et al. ................. 380/259 |
| 7,480,384 | B2 | * | 1/2009 | Peyravian et al. ............ 380/277 |
| 7,559,090 | B2 | * | 7/2009 | Takagi et al. ................... 726/27 |
| 2001/0016834 | A1 | * | 8/2001 | Yamanaka et al. ............. 705/40 |
| 2002/0187808 | A1 | | 12/2002 | Vallstrom | |
| 2004/0038669 | A1 | | 2/2004 | Kim | |
| 2004/0111615 | A1 | * | 6/2004 | Nyang et al. .................. 713/168 |
| 2006/0070116 | A1 | * | 3/2006 | Park ................................. 726/3 |
| 2006/0090203 | A1 | * | 4/2006 | Husain et al. .................. 726/17 |
| 2006/0123469 | A1 | * | 6/2006 | Lee et al. .......................... 726/4 |

(Continued)

FOREIGN PATENT DOCUMENTS
EP 1 548 976 6/2005
(Continued)

OTHER PUBLICATIONS

Andrew S Tanenbaum, Computer Networks, 2003, Prentice Hall, Fourth Edition, 791-795.*

(Continued)

*Primary Examiner* — Christopher Revak
(74) *Attorney, Agent, or Firm* — Squire Sanders (US) LLP

(57) ABSTRACT

A method in a communication system. The mobile station is provided with two or more separate subscriber modules having separate authentication identities. The modules are authenticated and a session key is established between these subscriber modules using the system as a trusted party. The invention improves the ability of the communication system to adjust to the varying operational conditions of the users, and user organizations.

46 Claims, 5 Drawing Sheets

U.S. PATENT DOCUMENTS

| | | | |
|---|---|---|---|
| 2006/0171536 A1* | 8/2006 | Lim | 380/247 |
| 2006/0174332 A1* | 8/2006 | Bauban et al. | 726/5 |
| 2007/0286373 A1* | 12/2007 | Pailles et al. | 379/142.03 |
| 2010/0208896 A1* | 8/2010 | Goto | 380/279 |
| 2010/0208897 A1* | 8/2010 | Goto | 380/279 |
| 2010/0325435 A1* | 12/2010 | Park et al. | 713/171 |
| 2011/0138185 A1* | 6/2011 | Ju et al. | 713/171 |
| 2012/0054492 A1* | 3/2012 | Kim et al. | 713/168 |

FOREIGN PATENT DOCUMENTS

| | | |
|---|---|---|
| FR | 2 831 362 | 4/2003 |
| FR | 2 866 766 | 8/2005 |
| WO | WO 01/13666 | 2/2001 |
| WO | WO 2006/056669 | 6/2006 |
| WO | WO 2006056669 A1 * | 6/2006 |
| WO | WO 2006/072746 | 7/2006 |

OTHER PUBLICATIONS

D.W. Parkinson, "TETRA security", BT Technology Journal, vol. 19, No. 3, Jul. 2001, pp. 81-88.

* cited by examiner

MOBILE STATION AUTHENTICATION IN TETRA NETWORKS

FIELD OF THE INVENTION

The present invention relates to communication systems, and particularly to authentication of a mobile station in a mobile communication system.

BACKGROUND OF THE INVENTION

Communication system is a combination of system elements, configured to process and transfer information according to agreed conventions. Operations of the system involve one or more system elements and/or one or more users of the system, and are clustered to services that may be utilized by users of the system. Involved parties are identified by an address, a data structure or logical convention that may be used to identify a unique entity, such as a particular process, network device or user.

Depending on the role of the element in the information transfer and the protocol followed in the communication, entities are addressed differently. The term subscriber refers here to a user of at least one communication service of the communication system. A subscriber thus refers to an entity that has access to a group of one or more communication services, and in implementations of the services the subscriber may be addressed by a unique subscriber identity allocated at provisioning the service. A subscriber identity is thus a digital subject that provides the individual characteristics by which an application or a person may be recognized or known in order to be involved with the operations of the communication system.

In communication, the ability to prevent fraud as well as protect availability, integrity, and confidentiality of information is of utmost importance. One of the essential criteria for communication services is that only the intended parties should be able to get involved with the operations, for example, access the exchanged information, or initiate/terminate operations of the systems. In the wealth of digital information users, advanced systems need to provide a variety of functions confirming the claimed identity of a user.

Authentication provides a codified assurance of the identity of one entity to another. Authentication is typically achieved by the parties proving to each other knowledge of a shared secret. In digital communication systems, demonstration of this knowledge requires that a codified set of algorithms and encryption keys are stored in elements representing the parties. Such elements include especially the elements that are accessible to public, typically the integrity of network elements is secured in more conventional ways.

The algorithms and keys are stored in a system element in such a way that the secret may not be compromised. Typically any subscriber-related information applicable for authentication is stored in the element, for example, in a mobile station of the communication system the information resides in an integrated memory module or in a removably insertable subscriber identity module. The secret information is very well protected and made completely inaccessible by tear-down of the apparatus. As a matter of fact, any malicious attempt to retrieve the information fails and often permanently damages the tampered module or terminal equipment.

Recent development of communication systems and advanced communication needs has, however, led to situations, where the subscriber identity information of a mobile station for the communication system needs to be stored in more than one subscriber modules. For example, in highly developed communication systems for safety and security organizations, the subscriber identity information is stored in an integrated subscriber module of the mobile station, and the mobile station is further provided with removable subscriber identity modules that carry the keys and algorithms for end-to-end encryption. Since the management of the end-to-end encryption is typically not trusted with the terminal suppliers, it has been possible to manage the subscriber identity information of the end-to-end encryption service and the subscriber identity information for the services of the communication system separately.

However, in an organization there may be a shared pool of communication terminals, each of which is assigned a subscriber identity for the services of the communication system. In addition, some users of these terminals may carry an individual subscriber identity module, and share the terminal with one or more users. One terminal could thereby be shared between different users at separate times, for example working shifts, which makes it possible to have more communication users than there are terminals.

In these circumstances, subscriber identity information needs to be managed in such a way that parallel use of at least two subscriber identities in the mobile station is enabled but compromising the subscriber related information in the system or transmitted in the system by an abusing party is eliminated.

SUMMARY OF THE INVENTION

An object of the present invention is to provide a solution in a communication system so as to securely enable parallel use of more than one subscriber modules in one mobile station. Parallel use means that at least two subscriber modules are authenticated by the communication system such that the other one manages the operations in the air interface and the other one manages the operations regarding the individual subscription.

The object of the invention is achieved by a method, a switching and management infrastructure element, a mobile equipment, a detachable subscriber module, a mobile station, a communication system, and a computer program product, which are characterized by what is stated in the independent claims. The preferred embodiments of the invention are disclosed in the dependent claims.

The invention is based on the idea of introducing to the mobile station two or more separate subscriber modules with separate authentication identities, and establishing a session key between these subscriber modules using the system as a trusted party.

An advantage of the invention is that it improves the ability of the communication system to safely adjust to the varying operational conditions of the users, and user organizations.

Different embodiments of the invention provide several further advantages discussed in the detailed description of the invention.

BRIEF DESCRIPTION OF THE DRAWINGS

In the following the invention will be described in greater detail by means of preferred embodiments with reference to the attached drawings, in which.

DETAILED DESCRIPTION OF THE PREFERRED EMBODIMENTS

The following embodiments are exemplary implementations of the present invention. Although the specification may refer to "an", "one", or "some" embodiment(s), reference is not necessarily made to the same embodiment(s), and/or a feature does not apply to a single embodiment only. Single features of different embodiments of this specification may be combined to provide further embodiments.

In the following, the invention is described using the terms and elements of the TETRA air interface as specified in the European Telecommunication Standards ETSI EN 300 392-2; European Standard (Telecommunications series); Terrestrial Trunked Radio (TETRA); Voice plus Data (V+D); Part 2: Air Interface (AI), and ETSI EN 300 392-7; European Standard (Telecommunications series); Terrestrial Trunked Radio (TETRA); Voice plus Data (V+D); Part 7: Security, however, without limiting the invention to this one radio system technology. The present invention can be applied to any communication system, where subjects of communication service operations are identified by subscription.

Figure 1:
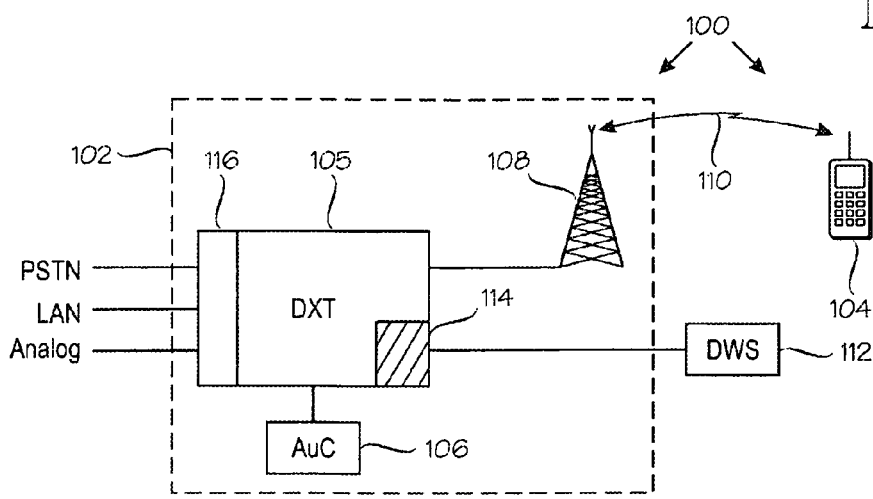
FIG. 1 shows a simplified illustration of the main elements of an embodied radio system.

FIG. 1 shows a simplified illustration of the main elements of an embodied radio system 10. The radio system 100 comprises a switching and management infrastructure (SwMI) 102 and a mobile station (MS) 104. SwMI 102 is equipment for a voice plus data (V+D) network, which enables the subscriber terminals to communicate with each other. In FIG. 1 SwMI comprises one digital exchange (DXT) 105, one authentication center (AuC) 106 and one base station (TBS) 108, but naturally the number of elements and their mutual interconnections may vary according to the implementation.

Of the subscriber terminals, the mobile station (MS) 104 is arranged to access SwMI via the air interface 110. The other type of subscriber terminals, the dispatching workstation 112, communicates with SwMI 102 through a dispatching interface 114, which can provide the connection using, for example, E1, ISDN BA, or IP protocols. In practice the radio system can comprise a multiplicity of dispatching workstations 112 and corresponding interfaces 114 of different type. Additionally, SwMI 102 comprises an interface 116 for interconnection with other networks, such as PSTN, GSM, WCDMA, conventional analog networks, LAN, WAN, and similar. The protocols related to different interfaces are implementation specific arrangements familiar from the prior art.

Figure 2:
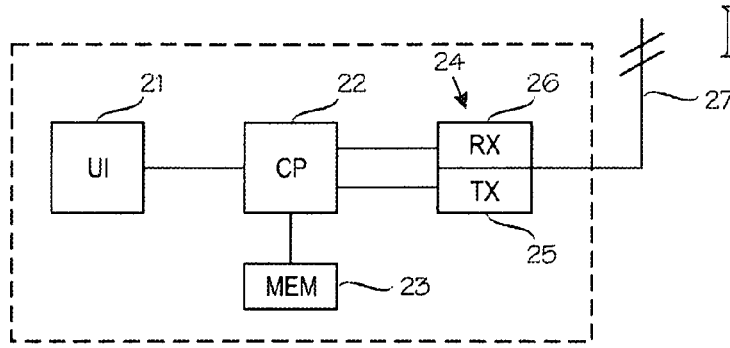
FIG. 2 shows a reference hardware configuration of the mobile station according to the invention.

The block diagram in FIG. 2 shows a reference hardware configuration of the mobile station (MS) 104 according to the invention. The mobile station 104 comprises a user interface unit 21 with at least one input unit for inputting data by the user of the mobile station and at least one output unit for outputting data. Examples of said input units comprise a keypad, a touch screen, a microphone, and equals. Examples of said output units comprise a screen, a touch screen, a loudspeaker, and equals. The user interface is electrically connected to a processing unit 22 for performing systematic execution of operations upon data. The processing unit 22 is a central element that essentially comprises an arithmetic logic unit, a number of special registers and control circuits. For example, the functions implemented by the processing unit 22 in transmission typically comprise: encoding, reordering, interleaving, scrambling, channel multiplexing, and burst building. Memory unit 23, data medium where computer-readable data or programs, or user data can be stored, is connected to the processing unit 22. In a mobile station the memory unit 23 typically comprises memory units that allow for both reading and writing (RAM) and memory whose content can only be read (ROM).

A transceiver unit 24, comprising a transmitter 25 and a receiver 26 are electrically connected to the processing unit 22. The transmitter 25 receives a bitstream from the processing unit 22, and converts it to a radio signal for transmission by the antenna 27. Correspondingly, the radio signals received by the antenna 27 are led to the receiver 26, which converts the radio signal into a bitstream that is forwarded for further processing to the processing unit 22.

The processing unit 22, memory unit 23, user interface unit 22 and transceiver unit 24 are electrically interconnected to provide means for performing systematic execution of operations on the received and/or stored data according to the predefined, essentially programmed processes of the mobile station. In solutions according to the invention, the operations comprise functions for implementing the authentication procedures between the mobile station and the switching and management infrastructure. These operations are described in more detail with FIGS. 4 to 7.

Figure 3:
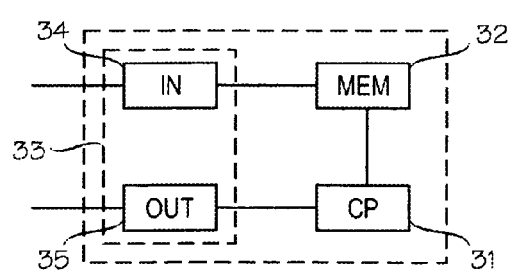
FIG. 3 illustrates a reference hardware configuration of a switching and management infrastructure element according to the invention

The block diagram in FIG. 3 shows a reference hardware configuration of a switching and management infrastructure element 4 according to the invention. The element comprises a processing unit 31, an element that comprises an arithmetic logic function, a number of special registers and control circuits. Connected to the processing unit is a memory unit 32, a data medium where computer-readable data or programs or user data can be stored. As with the mobile station, the memory unit typically comprises both RAM and Rom memory units. The element further comprises an interface block 33 with input unit 34 for inputting data for internal processing in the element, and output unit 35 for outputting data from the internal processes of the element. Examples of said input unit comprise a plug-in unit acting as a gateway for information delivered to its external connection points. Examples of said output unit include plug-in unit feeding information to the lines connected to its external connection points.

The processing unit 31, memory unit 32, and interface block 33 are electrically interconnected for performing systematic execution of operations on the received and/or stored data according to the predefined, essentially programmed processes of an element of the switching and management infrastructure. These operations are described in more detail with FIGS. 4 to 7.

It should be noted that only elements necessary for disclosing the present embodiment are illustrated in FIGS. 2 and 3. For a person skilled in the art it is clear that mobile station and switching and management infrastructure elements comprise a plurality of further elements and functionalities not explicitly illustrated herein. In addition, the blocks illustrate logical or functional units that may be implemented in or with one or more physical units, notwithstanding whether they are illustrated as one or more blocks in FIGS. 2 and 3. For example, subscriber identities and corresponding authentication keys are stored and verified in the authentication center of SwMI, but in authentication operations part of the procedure, for example delivery of authentication messages, are performed in DXT and BS as well. The reference configuration shown in FIG. 3 is also applicable to the configuration of a detachable subscriber module.

Security mechanisms in communication systems provide mechanisms for confidentiality of control signaling and user speech and data at the air interface, authentication and key management mechanisms for the air interface. Authentication refers to confirmation of the claimed identity of a user, and/or of a message not having changed after it has been sent.

As for a mobile station operating in TETRA systems, a subscription is identified by individual TETRA subscriber identity (ITSI), and the hardware of MS is identified by TETRA equipment identity (TEI).

TEI is allocated by the equipment manufacturer and is associated with the hardware of the mobile station. The TEI uniquely identifies one piece of TETRA equipment, either one mobile terminal or one network terminal. TEI is typically utilized in disable/enable procedures that allow disabling and enabling of the MS equipment, the subscription, or both. The TEI, when included in signaling, is not protected by any specific cryptographic sealing mechanism, so it is basically provided only when encryption parameters have been established, and air interface encryption is operating on a cell.

Subscriber identities exist in two sizes, TETRA Subscriber Identity (TSI) that is 48 bits long, and Short Subscriber Identity (SSI) that is 24 bits long. The SSI is typically a truncation of the TSI. TSI is unique across the complete TETRA domain, SSI needs to be unique only in one TETRA subdomain. Each MS contains at least one family of TSIs. Each family contains one Individual TETRA Subscriber Identity (ITSI) and may also have one Alias TETRA Subscriber Identity (ATSI) and several Group TETRA Subscriber Identities (GTSI). The TSI family is valid for a home TETRA network. Likewise, one or several visitors TSI families may also coexist with the home TSI family but they do not contain a visiting equivalent to the individual identities.

The conventional authentication method disclosed in TETRA specifications uses a symmetric secret key type. In this method one secret, the authentication key, is shared by each of the authenticating parties, and there are strictly two parties with knowledge of the secret. Authentication is achieved by the parties proving to each other knowledge of the shared secret.

The authenticating parties are typically the authentication centre of the Switching and Management Infrastructure (SwMI) and the Mobile Station (MS). The MS is considered, for the purposes of authentication, to represent the user as defined by the Individual TETRA Subscriber Identity (ITSI). The design of SwMI is not specified by standards, so also some other network entity, such as a Base Station (BS), may carry out the authentication protocol on behalf of the authentication centre. This entity is assumed to be trusted by SwMI and the authentication exchange proves knowledge given to this entity by the authentication centre. In this embodiment the knowledge is demonstrated by means of a session authentication key (KS).

A session key relates to a combination of one ore more cryptographic keys that are randomly generated between at least two parties for the duration of a communication session and may be used for authenticating communication parties and/or encrypting and decrypting information exchanged between these parties. In this context the communication session refers to a group of one or more transmissions exchanged between the parties sharing the session key for a period. Since the session key is created at authentication of the mobile station, the session period relates to an interval between two consecutive authentications. Random generation of keys refers here to the feature that at least one random number that expires at the end of the session is used in generating the session key. The use of session specific key ensures that the authentication key associated with the subscription is never visible outside the Authentication Centre. Authentication and provision of keys for use at the air interface are linked by the use of a common algorithm set.

Encryption relates to an information security mechanism that performs information transformation according to a selected cryptographic system. Encryption may be used to transform intelligible data whose semantic content is available into a ciphertext object whose contents cannot be seen or utilized without the algorithms and keys that correspond to the selected cryptographic system. Decryption is used to transform the ciphertext object back to cleartext data. Encryption methods as such are well known to a person skilled in the art and will not be disclosed in more detail herein.

The agreed standards specify that the subscription, identified by one ITSI, may be stored in a memory unit of the hardware, or contained in a separable module. In order to be able to securely allow subscription related functions parallelly in two separable modules, an enhanced procedure is needed.

According to the invention, the switching and management infrastructure acts as a trusted party and authenticates both the first subscriber module and the second subscriber module using secret information that is accessible or verifiable only to the authenticating parties. In symmetric authentication authenticating parties demonstrate knowledge of secret information that is shared with the authenticating parties but not available or derivable without significant effort to a third party. In asymmetric authentication pairs of public-private keys are used to encrypt and decrypt data.

Within the authentication operations a session key is established for the transmissions between the first subscriber module and the switching and management infrastructure. In addition a random number is generated in the second subscriber module and a delivered to the first subscriber module. For the situations where the likelihood of false mobile equipment is small the delivery of the random number by the second subscriber module does not necessarily need to be secured. However, the invention also provides a possibility to ensure that the random number by the second subscriber module may only be received by a first subscriber module that has been successfully authenticated by the switching and management infrastructure.

Within the authentication operations a random number is also generated in the first subscriber module or in the switching and management infrastructure and a delivered to the second subscriber module. The invention ensures that this random number may only be received by a second subscriber module that has been successfully authenticated by the switching and management infrastructure.

When both subscriber modules have been successfully authenticated by the switching and management infrastructure and the newly generated random numbers are available in both of the subscriber modules, a session key for the transmissions between the first subscriber module and the second subscriber module can be established from some combination of the random numbers, for example by use of xor mixing.

Figure 4:
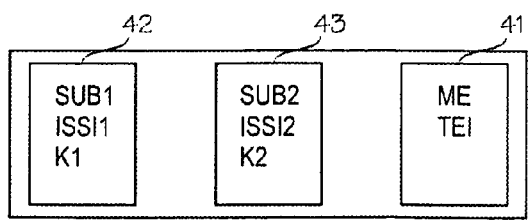
FIG. 4 illustrates an embodiment of the logical configuration of the different identities used in the mobile station.

FIG. 4 illustrates an embodiment of the logical configuration of the different identities used in the mobile station, implemented in the embodied mobile station of FIG. 2 operating in the embodied communication system of FIG. 1.

FIG. 4 shows the mobile station 2 comprising a mobile equipment 41, identified by TEI, a first subscriber module S1 42, identified by a first individual short subscriber identity ISSI1 and a detachable subscriber module S2 43, identified by a second individual short subscriber identity ISSI2. In the embodiment of FIG. 4, the first subscriber module corresponds with a memory unit integrated within the mobile station and directly accessible to the processing unit. The detachable subscriber module corresponds with a security module that may be removably inserted into a piece of mobile equipment for subscriber identification and other security related information, and is accessible to the processing unit through an interface defined between the mobile equipment and the removable subscriber module.

The first subscriber module 42 is configured with a first secret key K1, a cryptographic key that is used with a cryptographic algorithm and whose availability is restricted such that the secret is shared by the first subscriber module 42 and the authentication centre of SwMI but not with the second subscriber module. Correspondingly, the second subscriber module 43 is configured with a second secret key K2, whose availability is restricted such that the secret is shared by the second subscriber module 43 and the authentication centre of SwMI but not with the first subscriber module. Procedures for secret key management and distribution are well documented and generally known to a person skilled in the art, so they will not be disclosed in more detail herein.

Figure 5:
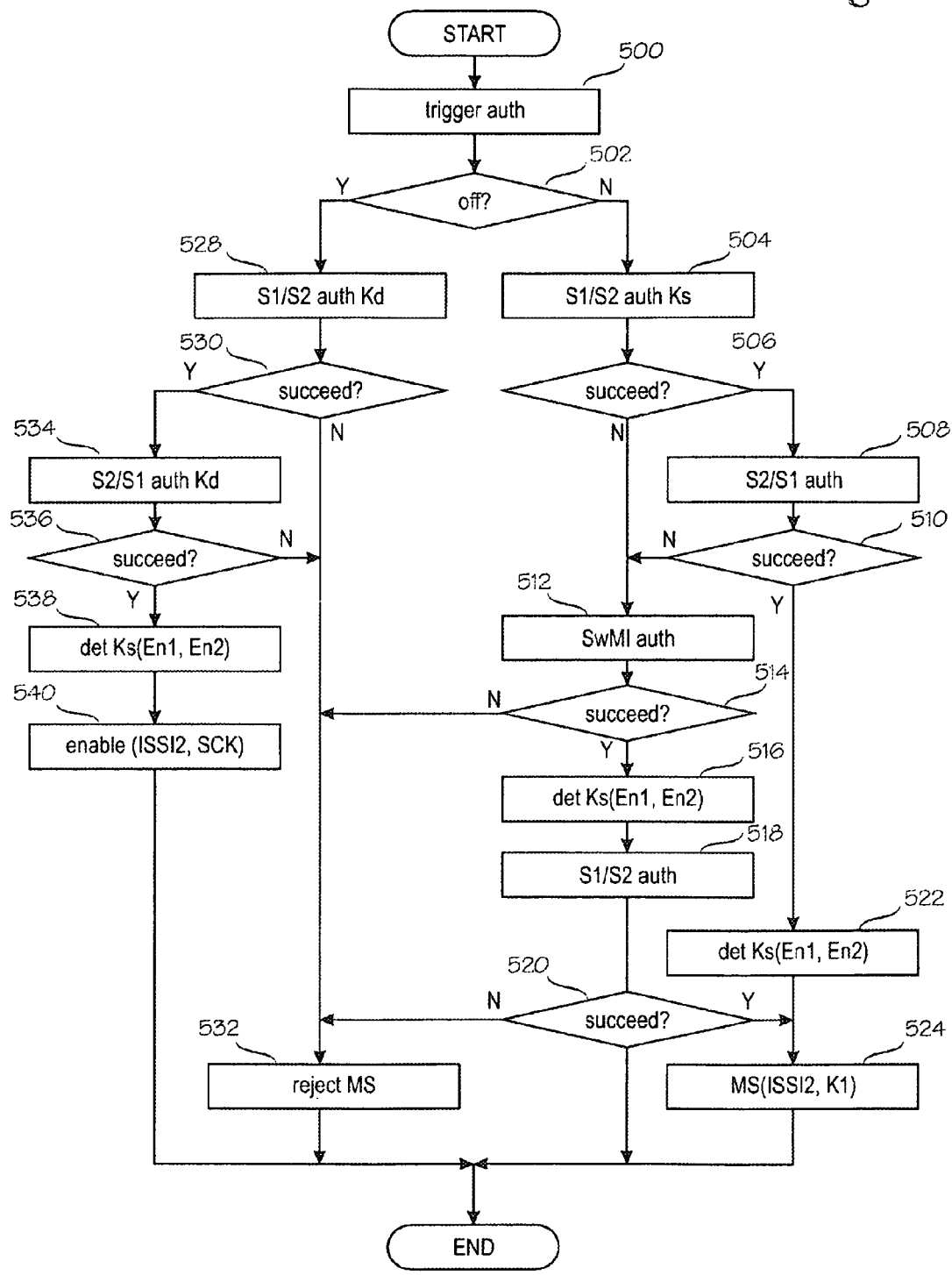
FIG. 5 illustrates an embodiment of implementing an authentication procedure for the mobile station configuration illustrated in FIG. 4.
Figure 6:
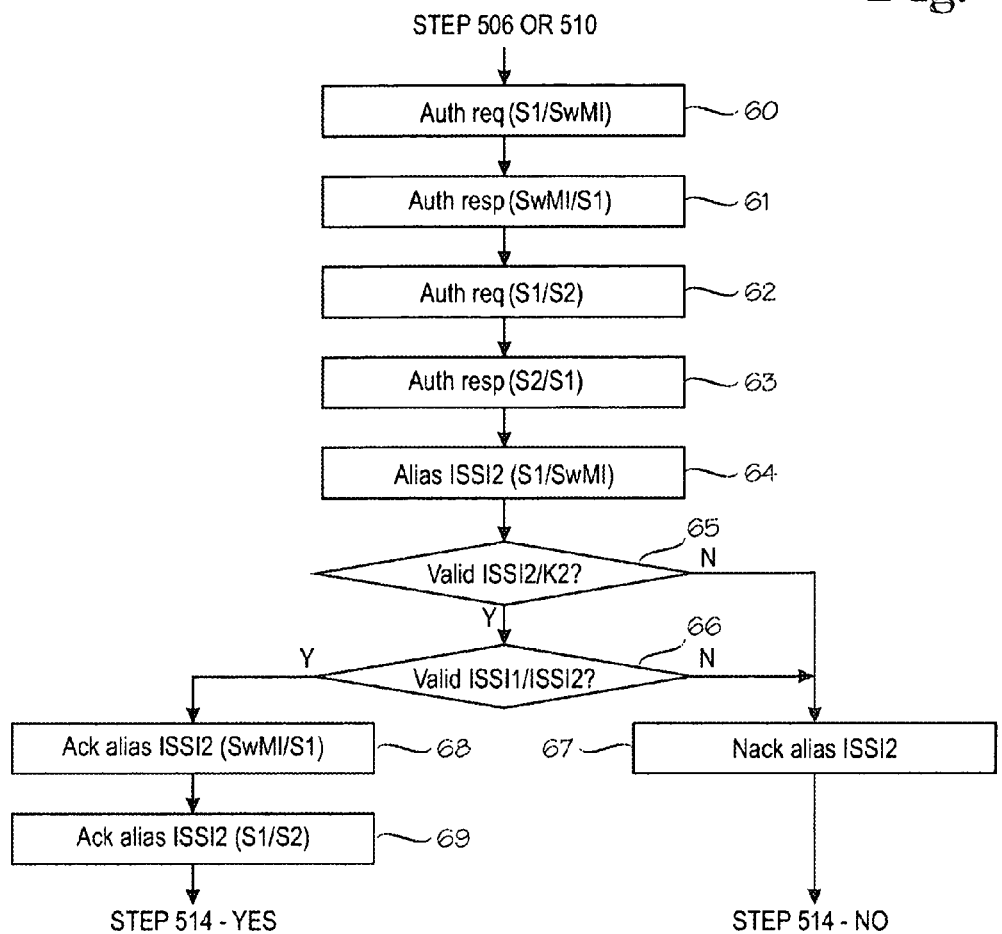
FIG. 6 illustrates the embodied authentication procedure.

FIG. 5 illustrates an embodiment of implementing a symmetric authentication procedure for the mobile station configuration illustrated in FIG. 4. In the embodiment of FIG. 5, the first subscriber module is realized as an integral part of the mobile equipment and the combination of the first subscriber module and the mobile equipment is referred to as the mobile equipment. Correspondingly, in the embodiment of FIG. 5, the second subscriber module is realized as a detachable subscriber identity module. The full combination of the mobile equipment and the detachable subscriber module are referred to as the mobile station. It should be noted that the implementations of the first subscriber module and the detachable subscriber module may vary, so the used terms relate to the specific embodiment only and should not be used in a restrictive manner in interpreting the scope of protection. For example, the type of the subscriber modules may be interchanged within the scope of protection. Also, the subscriber modules may be of the same type or of different types, according to the application.

The embodied mobile station is configured with a group of operation states that initiate an authentication procedure. An example of such instances is a power-up of the mobile station, when a mobile station typically initiates (step 500) a normal registration and authentication sequence with SwMI of the system. The mobile equipment stores a pair of values ISSI2 and Ks that include the identity of the latest detachable subscriber module the mobile equipment has authenticated to operate with in the common mobile station and the latest session key established for the communication between the mobile equipment and the detachable subscriber module.

According to the invention, the subscriber modules in the mobile station implement mutual authentication on the basis of the secret that they share with the authentication centre of SwMI. In an advantageous embodiment of the invention, the mobile equipment and the detachable subscriber module are further configured with an authentication procedure that is applicable for the mutual authentication of the subscriber modules when SwMI is not accessible, for example at the time of direct mode operation. Thus, in the embodied example, at the triggering instance, the mobile equipment checks the operation state to decide (step 502) whether the authentication procedure for the off-system operation needs to be applied.

In the negative case, the mobile equipment forwards (step 504) to the detachable subscriber module a message (Rn1, ISSI2) $Ks_{12}$ comprising a random number Rn1 generated by the mobile equipment, and ISSI2, both encrypted with the session key $Ks_{12}$ derived during the previous authentication session.

It is clear that the detachable subscriber module is able to decrypt the message only if it knows the session key $Ks_{12}$. The detachable subscriber module has that information only if it is the same detachable subscriber module that was used in the mobile station during the earlier authentication, for example, before the power-off. If the decryption succeeds, the detachable subscriber module verifies that it is the subscriber module addressed by ISSI2, and generates a response (Rn1 xor ISSI1, Rn2) $Ks_{12}$ that comprises the random number Rn1 received from the mobile equipment, mixed with the identity ISSI1 of the previous mobile equipment the detachable subscriber module has authenticated to operate with in the common mobile station, and a random number Rn2 generated by the detachable subscriber module. The message is again encrypted with the session key $Ks_{12}$ derived during the previous authentication session.

The mobile equipment checks (step 506) the value of the Rn1 in the received message to see whether the detachable subscriber module is able to adequately demonstrate its identity. If the value of Rn1 is correct, it indicates that the detachable subscriber module was able to decrypt the message and extract the correct random number. This verifies that the detachable subscriber module was the intended communication party. In addition, the mobile equipment can be sure that the information demonstrating the knowledge is not generated by recording and replaying a message from earlier communications, because the random number Rn1 used for mixing the identity ISSI1 is new for this particular communication instance.

In case of positive finding in step 506, the procedure moves to verify the identity of the mobile equipment. In order to enable the detachable subscriber module to securely verify the mobile equipment, the mobile equipment generates a response $(Rn2)Ks_{12}$ (step 508) comprising the random number Rn2 extracted from the encrypted message sent by the detachable subscriber module, encrypted with the session key $Ks_{12}$. The detachable subscriber module checks (step 510) the value of the Rn2 in the received message to see whether the mobile equipment is able to adequately demonstrate its identity. If the value of Rn2 is correct, it indicates that the mobile equipment was able to decrypt the message and extract the correct random number. Again, this verifies that the mobile equipment was the intended communication party. In addition, the detachable subscriber module can be sure that the information demonstrating the knowledge is not generated by recording and replaying a message from earlier communications, because the random number Rn2 is new for this particular communication instance.

Accordingly, in case of negative finding in either of the steps 506 or step 510, an authentication procedure utilizing SwMI is initiated (step 512). The authentication procedure is illustrated in more detail with the flow chart of FIG. 6. The mobile equipment initiates a conventional registration and authentication procedure (step 60) between the mobile station and SwMI, using the secret key K1 and identity ISSI1 of the mobile equipment. As a result of the procedure, the validity of the secret key K1 and identity ISSI1 of the first subscriber are verified, and a dynamic ciphering key DCK for encrypting the information in the air interface is made accessible in the mobile equipment as well as in SwMI. The TETRA authentication is widely documented and well known to a person skilled in the art, so it will not be described in more detail herein.

After SwMI has accepted the information provided by the mobile equipment, in one of its responding messages SwMI provides (step 61) the mobile equipment with a random seed Rn3 and at the same time orders the mobile equipment to identify the inserted detachable subscriber module.

Advanced modern ciphering methods provide several methods for implementing the authentication of subscriber modules on the basis of separate secrets that they share with SwMI. In the following, and exemplary embodiment utilizing symmetric ciphering methods is disclosed in more detail. As a response to the identity confirmation request by SwMI, the mobile equipment sends (step 62) to the detachable subscriber module a message requesting the detachable subscriber module to provide its identity. The random seed Rn3 provided by SwMI is included to the request. The detachable subscriber module generates (step 63) a response ISSI2, (ISSI2 xor Rn3, Rn2)K2. The response comprises the random seed Rn3 received from the SwMI and forwarded by the mobile equipment, mixed with the identity ISSI2, and a random number Rn2 generated by the detachable subscriber module, encrypted with the secret key K2 that the detachable subscriber module shares with SwMI but not with the mobile equipment. The response also comprises the requested identity of the detachable subscriber module in a non-encrypted form.

On the basis of the response, the mobile equipment generates (step 64) an aliasing message (ISSI2, Rn1, (ISSI2 xor Rn3, Rn2)K2)DCK. Aliasing itself is a conventional procedure in which a short TETRA subscriber identity is exchanged for an alias identity. The aliasing message in the embodied system comprises the information received in the response by the detachable subscriber module complemented with a random number generated by the mobile equipment, everything encrypted with the dynamic ciphering key DCK acquired during the original authentication procedure, and not shared with the detachable subscriber module.

The mobile equipment is not able to decrypt the response by the detachable subscriber module because it is encrypted with the secret key K2. SwMI is able to decrypt the message encrypted by the mobile equipment because it knows DCK. In addition, SwMI is able to decrypt the response by the detachable subscriber module because it knows the secret key K2. Through the use of the random number Rn3 previously provided by itself, SwMI can be sure that the knowledge is not generated by recording and replaying a message from earlier communications. SwMI may thus authenticate the detachable subscriber module by checking (step 65) that the ISSI2 and K2 pair is valid. If the check is positive the ISSI2 is thus applicable as an aliasing identity.

As a further control step, SwMI may also check (step 66) whether the first and detachable subscriber modules are allowed to operate together. Conventionally, the authentication center is used to store the subscriber identities and corresponding authentication keys. Referring to FIG. 1, as a further embodiment of the invention, the authentication center 106 may be further configured with a protected memory module, which allows to compute authentication related information that does not disclose the corresponding secrets with normal access permissions, but allows changing or adding of identities and authentication keys only with a special permission. In addition to the conventional control over allowable individual mobile equipment and subscriber modules, a party that has this special permission is able to control which terminals and subscriber modules may be operated together in the network.

If either of the checks 65 or 66 fails, the aliasing request is rejected (step 67) whereby the parallel operation of the mobile equipment and the detachable subscriber module is disabled. The procedure moves to step 514 of the original authentication procedure, with a negative success data.

If both of the checks succeed, SwMI accepts the aliasing request, links the aliasing identity ISSI2 and the secret key K1, and generates (step 68) an aliasing response (ISSI2, Rn2, (ISSI2 xor Rn2, ISSI1, Rn1)K2)DCK to the mobile equipment. The aliasing response by SwMI comprises the aliasing identity ISSI2, and the random number Rn2 provided by the second subscriber but earlier passed in encrypted form through the mobile equipment. The aliasing response also comprises an authentication response from SwMI to the detachable subscriber module, encrypted with the secret key K2. The aliasing response is encrypted with DCK in order to ensure that it only a duly authenticated mobile equipment can receive it.

Accordingly, the mobile equipment decrypts the aliasing response, and is thereby able to receive acknowledgement of the aliasing identity ISSI2, and the random number Rn2. The mobile equipment knows that SwMI sends the acknowledgement only if the authentication of the detachable subscriber module was successful, so it can rely to the correct identity of the detachable subscriber module. In order to allow the detachable subscriber module to correspondingly authenticate it, the mobile equipment forwards (step 69) an aliasing acknowledgement message ((ISSI2 xor Rn2, ISSI1, Rn1)K2 to the detachable subscriber module. The message provides the detachable subscriber module with both identities ISSI1, ISSI2 necessary for the aliasing, and the random number Rn1, originally generated by the mobile equipment. Through the use of the secret key K2 the detachable subscriber module can, furthermore, be sure that the mobile equipment has not been able to tamper with the contents of the message. Through use of the random number Rn2 previously provided by itself the detachable subscriber module can be sure that the knowledge used by the mobile equipment to demonstrate its identity is not generated by recording and replaying a message from earlier communications. The procedure then moves to step 514 of the original authentication procedure, with a positive success data.

Returning to FIG. 5, after the mobile equipment has sent the aliasing acknowledgement message to the detachable subscriber module, both the mobile equipment and the detachable subscriber module should have knowledge on a secretly transferred random number Rn1 generated by the mobile equipment and random number Rn2 generated by the detachable subscriber module. The new session key $Ks_{12}$ to be used for encryption between the mobile equipment and the detachable subscriber module can therefore be safely formed (step 516) from an appropriate combination of the random numbers, for example $Ks_{12}$=Rn1 xor Rn2. The procedure then repeats the function of step 504 where the mobile equipment challenges (step 518) the detachable subscriber module with message (Rn1, ISSI2) $Ks_{12}$. If the detachable subscriber module is the intended party, it is now able to decrypt the message with $Ks_{12}$ and return the correct (Rn1 xor ISSI1, Rn2) $Ks_{12}$ response to the mobile equipment. Otherwise the authentication fails and the parallel use of the mobile equipment and the detachable subscriber module is disabled.

Accordingly, after both of the steps 510 or 520 are successfully performed, both the mobile equipment and the detachable subscriber module can in subsequent communications be sure that they deal with a reliably authenticated party. The verification is based on authentication using a secret shared between the mobile equipment and SwMI but not with the detachable subscriber module, and another secret shared between the detachable subscriber module and SwMI but not with the mobile equipment. These secrets are not exposed at any stage of the authentication procedures between any of the elements. In addition, the possibilities to record and replay messages by compromised use of the interface between the mobile equipment and the detachable subscriber module are eliminated by the use of session specific random numbers in the exchanged messages. Furthermore, an additional solution that allows a centralized control to the combinations of subscriber modules used parallelly in one mobile station is provided.

Accordingly, the mobile station may now be registered (step 524) to the communication system using aliased ISSI2 and secret key K1. SwMI accepts the registration because the ISSI2/K1 combination is linked during the aliasing sequence. The mobile station may now use any air interface encryption mechanisms with the ISSI2/K1 pair. On the other hand, any information exchange between the subscriber modules may be reliably protected with a session key $Ks_{12}$. The solution is thus applicable for, for example, enhancing the possibilities of the over-the-air delivery of static cipher keys.

In case of a positive finding directly in step 510, the mobile equipment and the detachable subscriber module now have knowledge on a reliably transferred random number Rn1 generated by the mobile equipment and random number Rn2 generated by the detachable subscriber module. The new session key $Ks_{12}$ to be used for encryption between the mobile equipment and the detachable subscriber module can therefore be immediately formed (step 522) from an appropriate combination of the random numbers, for example $Ks_{12}$=Rn1 xor Rn2. From here on the procedure moves to step 524 disclosed above.

In step 500 it is assumed that an off-system key Kd applicable for encryption at times when SwMI is not available is previously provided in a reliable procedure from SwMI to the mobile equipment and the detachable subscriber module. Advantageously, the off-system key Kd is common to mobile equipment and detachable subscriber modules that are allowed to operate together. SwMI is able to revoke or renew the off-system keys Kd, for example, according to a predefined security policy. Only mobile equipment trusted by the SwMI and detachable subscriber modules trusted by the SwMI can know the Kd. The proof of this knowledge about Kd is used for authentication when any of the mobile equipment is operated with any one of the detachable subscriber modules and SwMI is not available for authentication purposes.

Figure 7:
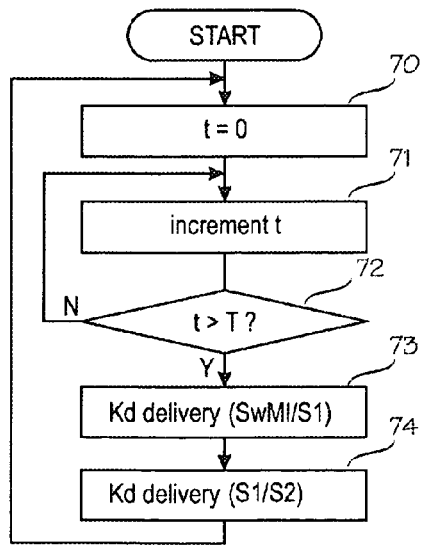
FIG. 7 illustrates an embodiment of a timer-based provisioning of the off-system authentication.

An embodiment of the referred reliable procedure is illustrated in more detail in FIG. 7. FIG. 7 illustrates an embodiment of a timer-based provisioning of the off-system authentication. For a person skilled in the art it is obvious that other manual or automatic operations for triggering the delivery of the off-system key Kd may be used. For example, the operator of the system or a user organization utilizing the system may define an off-system key update policy that takes into consideration also other factors or operational situations. The implementation of the policy may be managed from the switching and management infrastructure side of the system.

In step 70 the timer t is reset and in step 71 occurring after a predefined interval, the timer t is incremented. In step 72 it is checked, whether the count of the timer t exceeds a predefined time limit T. If not, the procedure returns to step 71 of incrementing the counter. If the predefined time limit is exceeded, SwMI sends to the mobile equipment a message (Kd, (Kd)K2)DCK. Knowing the DCK, the mobile equipment is able to decrypt the message, extract the Kd that is not encrypted with K2, and store it into its non-volatile memory, such that it is available at any time authentication is needed and SwMI is not available. Thus, only an authenticated mobile equipment is able to appropriately receive Kd. In step 74 the mobile equipment forwards the with K2 encrypted part of the message (Kd)K2 to the detachable subscriber module that also stores the decrypted Kd in its non-volatile memory for further usage. It is clear that only the detachable subscriber module with the secret key K2 can receive the off-system key Kd.

In consequence, when the mobile equipment checks (step 502) the operation state to decide whether the authentication procedure for the off-system operation needs to be applied, and detects a positive case, it generates (step 528) to the detachable subscriber module an off-system authentication message (C,Rn1)Kd. The off-system authentication message comprises a constant value C that is stored to and known by all subscriber modules for the purpose of off-system power ups, a new random number generated by the mobile equipment, encrypted with the reliably delivered key Kd stored in both subscriber units. In the embodied solution, constant C is primarily used to prove knowledge of the correct key Kd. For a person skilled in the art it is clear that knowledge can be proved in various other ways without deviating from the scope of protection.

The detachable subscriber module knows that only the mobile equipment with the knowledge of Kd is able to encrypt the off-system authentication message. If the decryption succeeds (step 530), the detachable subscriber module may now consider the mobile equipment appropriately authenticated and becomes aware of the random numbers Rn1 and Rn2. If the decryption fails, the attempt to use the mobile equipment and the detachable subscriber module parallelly in the same mobile station fails (step 532) and the mobile station cannot registrate to the system.

In the positive case, the detachable subscriber module extracts the random number Rn1, and generates (step 534) a response (C xor Rn1, ISSI2, Rn2)Kd to the mobile equipment. The response comprises the generally known constant value C mixed with the new random value Rn1 generated by the mobile equipment. The response comprises also the aliasing identity ISSI2 accepted by the system and a new random value generated by the detachable subscriber module. The mobile equipment decrypts the message and checks (step 536) whether the content is acceptable. The ability to return the random value Rn1 generated by the mobile equipment demonstrates that the detachable subscriber module was able to appropriately decrypt the previous message. In addition, now also the mobile equipment acquires the knowledge of the random numbers Rn1 and Rn2. Accordingly, in a positive case the mobile equipment and the detachable subscriber module are authenticated and may determine (step 538) an encryption key for the exchange of information between the first and the detachable subscriber module based on the combination of Rn1 and Rn2, for example, K12=Rn1 xor Rn2. After this, the communication with the two parallel subscriber modules is enabled. For example, in the embodied TETRA system, where the mobile equipment is a memory unit integrated in the device and the detachable subscriber module is a removably insertable SIM card, this means that the invented solution enables the mobile station to operate outside the network coverage in class 2 using static cipher keys provided in the SIM card.

Figure 8:
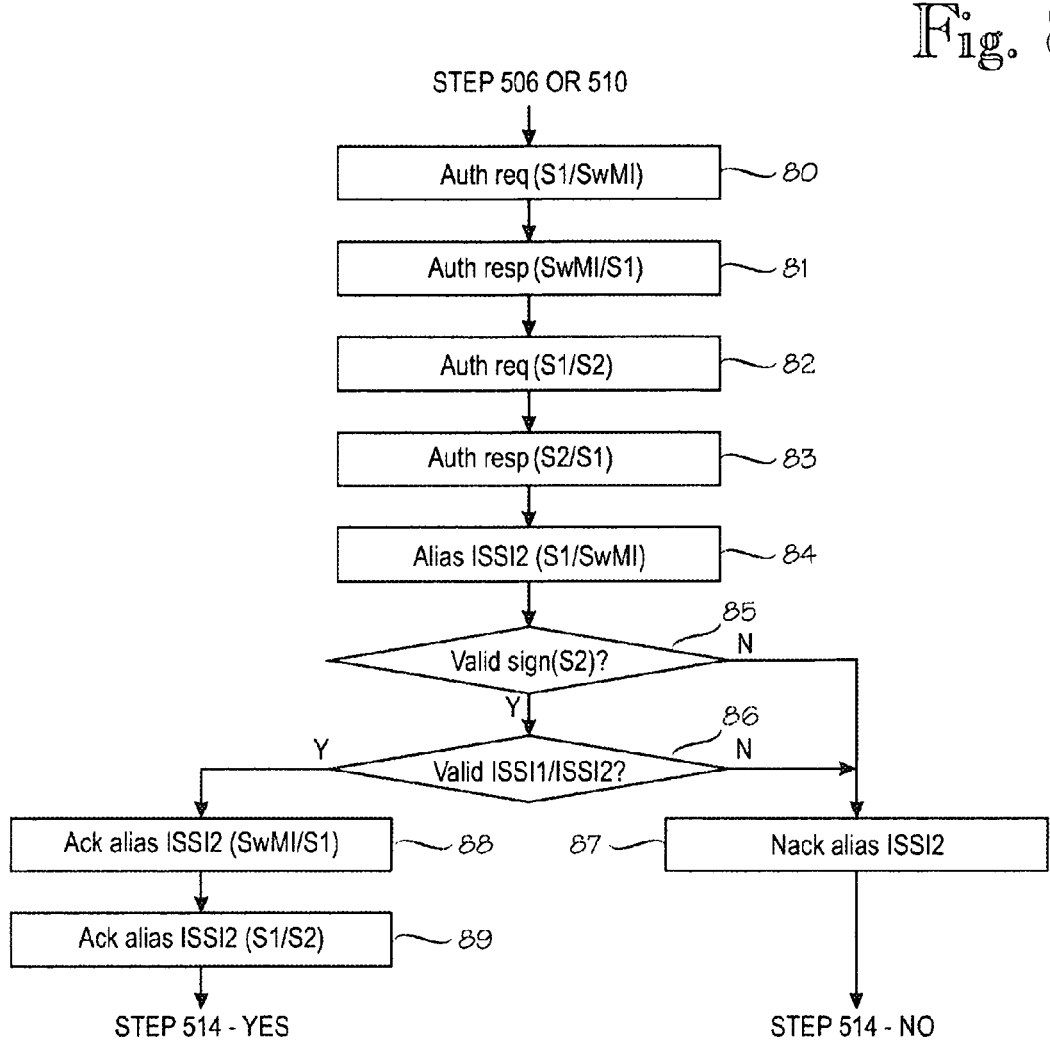
FIG. 8 illustrates an embodiment utilizing asymmetric ciphering methods.

FIG. 8 illustrates an embodiment of implementing an asymmetric authentication procedure for the mobile station configuration illustrated in FIG. 4. Steps 80 to 82 correspond directly with steps of FIG. 6 disclosed earlier, and for conciseness their description will not be repeated here. In receiving the identity request by the mobile equipment, the detachable subscriber module generates (step 83) a response encr (ISSI2, Rn2, sign(ISSI2 xor Rn3)) that comprises the requested identity ISSI2 mixed with the random seed Rn3 and signed with the private key of the sender, i.e. of the detachable subscriber module. The public key of the detachable subscriber module is known by the system and management infrastructure. The signed part is complemented with the requested identity ISSI2 and a random number Rn2 generated by the detachable subscriber module, and the combination is encrypted with the public key of the recipient, i.e. of SwMI.

The mobile equipment is not able to decrypt the response by the detachable subscriber module. It generates (step 84) an aliasing message (Rn1, encr(ISSI2, Rn2, sign(ISSI2 xor Rn3)))DCK to the system and management infrastructure. The aliasing message includes the random number Rn1 generated by the mobile equipment, and the encrypted response received from the detachable subscriber module, encrypted with the DCK derived during the original authentication procedure (steps 80 and 81). SwMI decrypts the message with DCK and the encrypted response by the detachable subscriber module with its own private key, verifies the signature with the public key of the detachable subscriber module. SwMI checks (step 85) whether the signature is valid.

If the check is positive the ISSI2 is thus applicable as an aliasing identity. As before, SwMI may also additionally check (step 86) whether the first and detachable subscriber modules are allowed to operate together.

If either of the checks 85 or 86 fails, the aliasing request is rejected (step 87) and the parallel operation of the first and the detachable subscriber module is thus disabled. The procedure proceeds to step 514 of the original authentication procedure, with a negative success data.

If both of the checks 85 and 86 succeed, SwMI accepts the aliasing request, and generates (step 88) an aliasing response (ISSI2, Rn2, encr(ISSI1, Rn1, sign(ISSI2 xor Rn2)))DCK to the mobile equipment. The aliasing response by SwMI comprises the aliasing identity ISSI2, and the random number Rn2 provided by the second subscriber but earlier passed in encrypted form through the mobile equipment. The aliasing response also comprises an authentication response from SwMI to the detachable subscriber module, encrypted with the public key of the detachable subscriber module. The aliasing response is encrypted with DCK in order to ensure that it only a duly authenticated mobile equipment can receive it.

The mobile equipment decrypts the aliasing message, and is thereby able to receive acknowledgement of the aliasing identity ISSI2, and the random number Rn2. The mobile equipment also knows that SwMI sends the acknowledgement only if the authentication of the detachable subscriber module was successful, so it can rely to the correct identity of the detachable subscriber module. In order to allow the detachable subscriber module to correspondingly authenticate it, the mobile equipment forwards (step 79) the aliasing acknowledgement message encr(ISSI1, Rn1, sign(ISSI2 xor Rn2)) to the detachable subscriber module. The message provides the detachable subscriber module with both identities ISSI1, ISSI2 necessary for the aliasing. The detachable subscriber module decrypts the message with its own private key and verifies the signature with the public key of SwMI. Through use of the random number Rn2 previously provided by itself the detachable subscriber module can be sure that the response from SwMI is not generated by recording and replaying a message from earlier communications. Only the SwMI is able to generate the correct signature, therefore the detachable subscriber module can be certain that the mobile equipment is authentic. From here on, the procedure again proceeds to step 514 of the original authentication procedure, with a positive success data.

The advantage of using an asymmetric solution is that private keys need to be stored in the respective elements only. Secure delivery of secret keys is a strict and laborious procedure, and avoiding it simplifies management and operation of the system.

Figure 9:
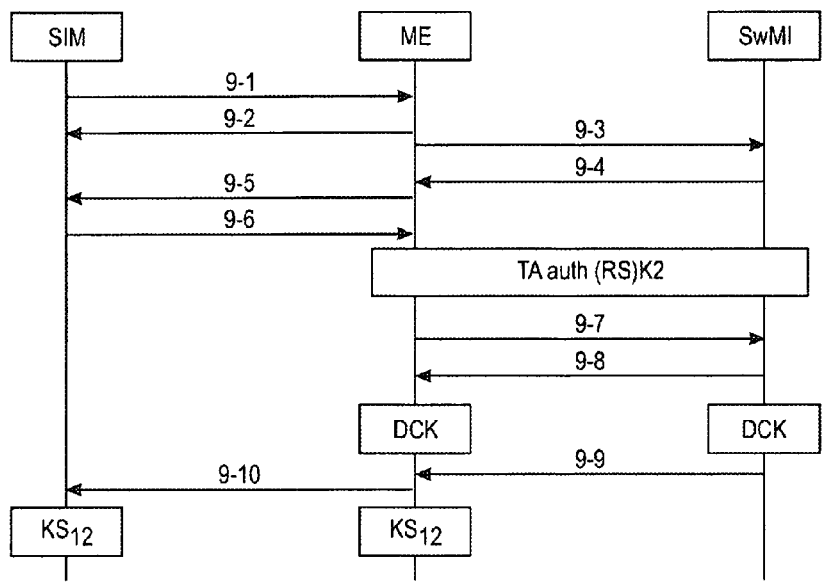
FIG. 9 illustrates a signaling sequence for implementing another embodied solution.

In the following, another exemplary embodiment utilizing symmetric ciphering methods is disclosed in more detail. The embodiment is based on arranging the authentication response to carry information depending on the secret keys of both subscriber modules. The embodied solution is based on modifying the conventional authentication procedure such that the knowledge on both the secret keys can be checked during authentication and a session key based on random values generated by the second subscriber module and the switching and management infrastructure are combined into a session key for transmissions between the first subscriber module and the second subscriber module. FIG. 9 illustrates a signaling sequence for implementing the embodied solutions. Depending on the application, the embodiment of FIG. 9 may be used as an alternative to the embodiments for FIGS. 6 and 8, or as an alternative the whole procedure of FIG. 5. As the embodiments of FIG. 6 and FIG. 8, the signaling sequence is initiated at least when the mobile equipment detects that the detachable subscriber mobile is not the same as the one it had authenticated earlier.

In such case the mobile equipment sends (9-1) a query requesting the detachable subscriber module to indicate its subscriber identity. The detachable subscriber module responds (9-2) with a message (ISSI2, Rn4) comprising its subscriber identity ISSI2 and a random number Rn4 generated for the response. The mobile equipment then generates and transmits (9-3) a location update message using the identity of the detachable subscriber module and also carrying its own subscriber identity. For example, the L2 layer address of the location update message is the address of the detachable subscriber module ISSI2 and an additional data element including the subscriber identity of the mobile equipment ISSI1 is included in the location update message.

Figure 10:
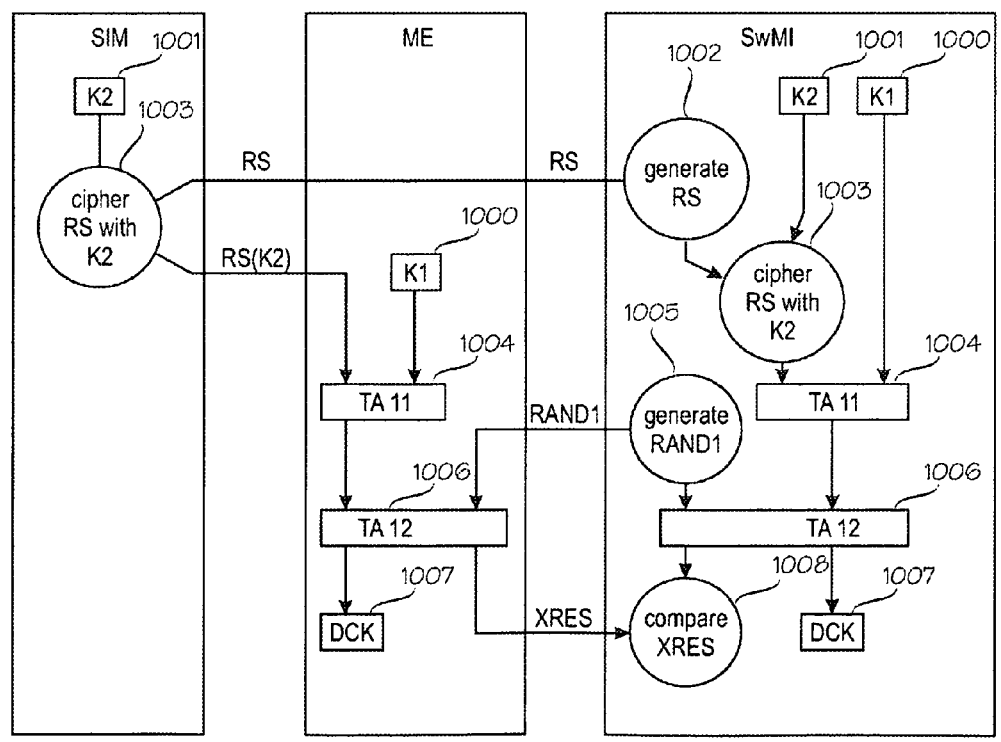
FIG. 10 illustrates in more detail the elements of the system embodied in FIG. 9.

The switching and management infrastructure responds (9-4) with an authentication demand. FIG. 10 illustrates n more detail the elements of the embodied system, and the combinations of secret keys, authentication algorithms and functions necessary for implementing the embodied authentication procedure.

SwMI stores the secret key K1 1000 of the mobile equipment and the secret key K2 1001 of the detachable subscriber module. SwMI is also configured with a function 1002 that generates a random number RS that is provided as a random seed to the mobile station. This random number basically corresponds with the random seed used in the conventional TETRA authentication procedure. In order to involve also the secret key of the detachable subscriber module, the mobile equipment passes this random seed (step 9-5 of FIG. 9) to the detachable subscriber module. Both the SwMI and the detachable subscriber module are also configured with a function 1002 that ciphers the random seed by SwMI with the secret key of the detachable subscriber module. The detachable subscriber module returns (step 9-6) the ciphered random seed to the mobile equipment. The mobile equipment and SwMi are configured with an authentication algorithm 1004, for example a conventional TETRA authentication algorithms TA11, that generates a session key KS. As shown in FIG. 10, in the embodied system, the session key KS is not generated using the random seed in the form it was created in the SwMI, but encrypted with the secret key of the detachable subscriber module. For a person skilled in the art it is clear that there are also other alternative ways to involve secret keys of both subscriber modules to the authentication process.

SwMI also comprises a function 1005 that generates another random number RAND1. This random number also corresponds with the additional random value provided over the air interface from SwMI to the mobile station in the conventional TETRA authentication procedure. Both SwMI and the mobile equipment comprise a second authentication algorithm 1006, for example TETRA authentication algorithm TA12 that on the basis of the session key KS and the second random number RAND1 by SwMI computes a dynamic cipher key DCK 1007 for the air interface encryption between the mobile station and SwMI. The result RES1 derived in the mobile equipment is transmitted (step 9-7) to SwMI that is configured with a further function 1008 that compares the received result RES1 with the result XRES computed in SwMI. In case RES1 and XRES match, a location update acknowledgement is transmitted (step 9-8) to the mobile station.

During the authentication procedure the validity of both secret keys K1 and K2 is checked and a dynamic cipher key is established for the transmissions between SwMI and the mobile equipment. A session specific random value Rn4 is also made known by the detachable subscriber module and the mobile equipment. In addition, SwMI generates a further random value Rn5, encrypts it with the secret key K2 of the detachable subscriber module, and sends (step 9-9) a message (Rn5, (Rn5)K2)DCK comprising the random value, and the encrypted random value, encrypted with the dynamic cipher key. The use of DCK ensures that only the authenticated mobile equipment operating parallelly with the authenticated detachable subscriber module may receive the random number properly. The mobile equipment decrypts the message, and forwards (step 9-10) the part it is not able to interpret (Rn5)K2 to the detachable subscriber module. A correct detachable subscriber module is then able to decrypt the message and receive the random value provided by SwMI. A session key K12 for the transmissions between the mobile equipment and the detachable subscriber module can be established from some combination of the random numbers Rn4 and Rn5, for example by use of xor mixing (K12=Rn4 xor Rn5).

If necessary, the authentication procedure may be utilized for simultaneous distribution on off-system keys. For example, SwMI may be configured to include also the combination of the off-system key Kd, and the off-system key (Kd)K2 encrypted with the secret key of the detachable subscriber module. This ensures that the off-system keys are available for both subscriber modules (the detachable subscriber module and subscriber module of the mobile equipment) operating within the mobile station any time after the authentication, and no separate procedure needs to be triggered for off-system key delivery. However, it is clear that delivery of off-system keys can be performed also in other times, as described earlier.

The embodied solution is simple and straightforward and requires only minor modifications to the established location update and authentication procedures. This makes the solution efficient and easily adaptable for implementations.

The values delivered between the different elements are typically pure binary strings and the detachable subscriber module is not necessarily able to tell whether the random number received from SwMI is truly the one that SwMI sent or whether some error in calculations or transmissions has occurred. In a further aspect the embodiment, the message 9-8 may be complemented to comprise a value with which the recipient may use to check the integrity of the received value. For example, SwMI may compute on the basis of the random number a cyclic redundancy check (CRC) value and include the value in the K2 encrypted part of the message. The detachable subscriber module may compute the CRC in the receiving end and if the CRC values match, the detachable subscriber module may be sure that the received random number Rn5 is truly the value sent by SwMI that knows the secret key of the detachable subscriber module.

In an aspect, the invention provides a computer program product encoding a computer program of instructions for executing a computer process in a mobile station, a detachable subscriber module or in an SwMI element.

In another aspect, the invention provides a computer program distribution medium readable by a computer and encoding a computer program of instructions for executing a computer process.

The distribution medium may include a computer readable medium, a program storage medium, a record medium, a computer readable memory, a computer readable software distribution package, a computer readable signal, a computer readable telecommunications signal, and/or a computer readable compressed software package.

Embodiments of the computer process are shown and described in conjunction with FIGS. 5 to 10. The computer program may be executed in the control unit of a mobile station, a detachable subscriber module or a SwMI element.

The embodiments above illustrate some exemplary ways to establish a reliable cryptographic key to ensure the security between two subscriber modules operating in one mobile station. In all solutions, however, the cryptographic key is generated using the system as a trusted party. When the communication in the interface between the subscriber modules is made secure, the mobile station may be operated such that the authenticated subscriber modules work in parallel, and the functions relevant to a service may be controllably implemented in either of the modules. The implementation of the solution causes minimal changes to existing, standardized operations of the communication system, which is a clear advantage when dealing with systems of large installed base.

The solution also provides a possibility to reliably decide which subscriber module pairs may be operated together. In the proposed solution, the control operations and the cumulative identity control data is stored in the switching and management infrastructure so that provisioning procedures for managing and distributing extensive lists on allowed or non-allowed identities are avoided.

The proposed solution may be embodied in way that the secured operations between the subscriber modules within the mobile station are not dependent on continuous support from the switching and management infrastructure.

Naturally, it will be obvious to a person skilled in the art that, as the technology advances, the inventive concept can be implemented in various ways not explicitly disclosed here.

The invention and its embodiments are not limited to the examples described above but may vary within the scope of the claims.

I claim:

1. A method in a communication system comprising a switching and management infrastructure, and a mobile station, the method comprising:
    including in the mobile station a first subscriber module and a second subscriber module;
    authenticating a subscription of the first subscriber module and the second subscriber module by the switching and management infrastructure;
    generating a first session key for the transmissions between the switching and management infrastructure and the authenticated first subscriber module, and
    generating at authentication a random number that becomes accessible to the first subscriber module and the second subscriber module after successful authentication of the first subscriber module and the second subscriber module;
    using the random number to generate a second session key for transmissions between the first subscriber module and the second subscriber module, the second session key being accessible only to the first subscriber module and the second subscriber module that are successfully authenticated by the switching and management infrastructure.

2. A method according to claim 1, further comprising:
    recording in the switching and management infrastructure the mobile station to use the subscriber identity of the second subscriber module.

3. A method according to claim 1, further comprising:
    generating in the first subscriber module or in the switching and management infrastructure a first random number;
    in response to the authentication of the subscription of the second subscriber module succeeding, delivering to the first subscriber module a message comprising the first random number encrypted with a key combination that prevents decrypting by the first subscriber module, the message being ciphered with the first session key;
    decrypting the message in the first subscriber module, and forwarding the first random number encrypted with a key combination that prevents decrypting by the first subscriber module to the second subscriber module.

4. A method according to claim 3, further comprising:
    generating in the second subscriber module a second random number;
    delivering the second random number to the first subscriber module;
    generating a session key for the communication between the first subscriber module and the second subscriber module on the basis of the first random number and the second random number.

5. A method according to claim 4, further comprising: delivering the second random number in an authentication message through the first subscriber module to the switching and management infrastructure, the second random number being encrypted with a key combination that prevents decrypting by the first subscriber module;
    in response to the authentication of the subscription of the second subscriber module succeeding, delivering the second random number to the first subscriber module encrypted using the first session key.

6. A method according to claim 1, further comprising checking in the switching and management infrastructure whether the first and the second subscriber module are allowed to operate parallelly in the mobile station.

7. A method according to claim 1, further comprising authenticating the subscription of the first subscriber module or the second subscriber module with a symmetric authentication procedure using a secret key shared between the switching and management infrastructure and the first or the second subscriber module, correspondingly.

8. A method according to claim 1, further comprising authenticating the subscription of the first subscriber module or the second subscriber module with an asymmetric authentication procedure using the public and private keys of the switching and management infrastructure and the first or the second subscriber modules, correspondingly.

9. A method according to claim 1, further comprising authenticating the subscription of the first subscriber module using as a random seed for an authentication algorithm a random seed generated by the switching and management infrastructure, encrypted with a secret key of the second subscriber module.

10. A method according to claim 9, further comprising:
    generating the first random number in the switching and management infrastructure;
    in response to the authentication with the encrypted random seed succeeding, delivering to the first subscriber module a message comprising the first random number encrypted with a key combination that prevents decrypting by the first subscriber module, the message being encrypted with the first session key;
    decrypting the message in the first subscriber module, and forwarding the first random number encrypted with a key combination that prevents decrypting by the first subscriber module to the second subscriber module.

11. A method according to claim 10, further comprising:
    computing, before encrypting the message with the first session key, an integrity value that allows a recipient to check the integrity of the received first random number;
    including in the message comprising the first random number the integrity value.

12. A method according to claim 1, further comprising:
    delivering an off-system key to successfully authenticated first and second subscriber modules; and
    utilizing the off-system key for mutual authentication or session key creation by the first and the second subscriber module when the switching and management infrastructure is not available for authentication.

13. A method according to claim 12, further comprising delivering a Previously Presented off-system key to successfully authenticated first and second subscriber modules at authentication, periodically or according to a predefined policy followed in the system.

14. A switching and management infrastructure element, comprising
    a memory module storing authentication keys and algorithms for authenticating a first and a second subscriber module;
    a control unit, the functions of the control unit being at least partially controlled by program code, said program code comprising
        program code configuring said element to link the first subscriber module and the second subscriber module to one mobile station;
        program code configuring said element to authenticate a subscription of the first subscriber module and the second subscriber module,
        program code configuring said element to generate a first session key for the transmissions between the switching and management infrastructure and the authenticated first subscriber module, and program code configuring said element to acquire at authentication of at least one of the subscriber modules a random number; and program code configuring said element to make the random number accessible to the other subscriber module, if the other subscriber module is successfully authenticated.

15. An element according to claim 14, wherein said program code further comprises program code configuring said element to record the mobile station to use the subscriber identity of the second subscriber module.

16. An element according to claim 14, wherein said program code further comprises program code configuring said element to receive a first random number from an authenticated first subscriber module;

program code configuring said element to, in response to the authentication of the subscription of the second subscriber module succeeding, deliver to the first subscriber module a message comprising the first random number encrypted with a key combination that prevents decrypting by the first subscriber module, the message being ciphered with the first session key.

17. An element according to claim 16, wherein said program code further comprises program code configuring said element to receive from an authenticated second subscriber module a second random number;

program code configuring said element to deliver the second random number to the first subscriber module such that a session key for the communication between the first subscriber module and the second subscriber module on the basis of the first random number and the second random number can be generated.

18. An element according to claim 17, wherein said program code further comprises program code configuring said element to receive the second random number in an authentication message delivered through the first subscriber module to the switching and management infrastructure, the second random number being encrypted with a key combination that prevents decrypting by the first subscriber module;

program code configuring said element to, in response to the authentication of the subscription of the second subscriber module succeeding, deliver the second random number to the first subscriber module encrypted using the first session key.

19. An element according to claim 14, said program code further comprising program code configuring said element to check whether the first subscriber module and the second subscriber module are allowed to operate parallelly in the mobile station.

20. An element according to claim 14, said program code further comprising program code configuring said element to authenticate the subscription of the first subscriber module or the second subscriber module with a symmetric authentication procedure using a secret key stored in the memory module and in the first subscriber module or the second subscriber module, correspondingly.

21. An element according to claim 14, said program code further comprising program code configuring said element to authenticate the subscription of the first subscriber module or the second subscriber module with an asymmetric authentication procedure using the public and private keys stored in the memory module and in the first subscriber module or the second subscriber module, correspondingly.

22. An element according claim 14, said program code further comprising:

program code configuring said element to generate a random seed;

program code configuring said element to authenticate the subscription of the first subscriber module by replacing a random seed for an authentication algorithm with a random seed originally generated and encrypted with a secret key of the second subscriber module.

23. An element according to claim 22, said program code further comprising:

program code configuring said element to generate the random number in the switching and management infrastructure;

program code configuring said element to, in response to the authentication with the encrypted random seed succeeding, deliver to the first subscriber module a message comprising the first random number encrypted with a key combination that prevents decrypting by the first subscriber module, the message being ciphered with the first session key.

24. An element according to claim 22, said program code further comprising:

program code configuring said element to compute, before encrypting the message with the first session key, an integrity value that allows a recipient to check the integrity of the received first random number;

program code configuring said element to include the integrity value in the message comprising the first random number.

25. An element according to claim 14, wherein said program code further comprises program code configuring said element to deliver an off-system key for mutual authentication or session key creation by the first and the second subscriber modules when the switching and management infrastructure is not available for authentication to the successfully authenticated first subscriber module and second subscriber module; and program code configuring said element to send the off-system key to the first subscriber module in a message comprising the off-system key, and the off-system key encrypted with a key combination that prevents decrypting by the first subscriber module, the message being ciphered with the first session key.

26. An element according to claim 25, wherein said program code further comprises program code configuring said element to deliver a Previously Presented off-system key to successfully authenticated first and second subscriber modules at authentication, periodically or according to a pre-defined policy followed in the system.

27. A mobile equipment comprising:

a first subscriber module;

an interface for a second subscriber module;

a control unit, the functions of the control unit being at least partially controlled by program code, said program code comprising program code configuring said equipment to authenticate a subscription of the first subscriber module and the second subscriber module with the switching and management infrastructure; said program code comprising program code configuring said equipment to generate a first session key for the transmissions between the switching and management infrastructure and the authenticated first subscriber module, and program code configuring said equipment to acquire at authentication a random number;

program code configuring said equipment to use the random number to generate a second session key for transmissions between the first subscriber module and the second subscriber module, the second session key being accessible only to the first subscriber module and the second subscriber module that are successfully authenticated by the switching and management infrastructure.

28. A mobile equipment according to claim 27, said program code further comprising:

program code configuring said mobile equipment to generate a first random number and send the first random number to the switching and management infrastructure;

program code configuring said mobile equipment to receive from the switching and management infrastructure a message comprising the first random number encrypted with a key combination that prevents decrypting by the first subscriber module, the message being ciphered with the first session key;

program code configuring said mobile equipment to decrypt the message, and forward the first random number encrypted with a key combination that prevents decrypting by the first subscriber module to the second subscriber module.

29. A mobile equipment according to claim 28, said program code further comprising:

program code configuring said mobile equipment to receive a second random number;

program code configuring said mobile equipment to generate the second session key for the communication between the first subscriber module and the second subscriber module on the basis of the first random number and the second random number.

30. A mobile equipment according to claim 29, said program code further comprising:

program code configuring said mobile equipment to receive the second random number from the second subscriber module encrypted with a key combination that prevents decrypting by the first subscriber module program code configuring said mobile equipment to deliver the second random number in an authentication message to the switching and management infrastructure;

program code configuring said mobile equipment to receive the second random number to the first subscriber module from the switching and management infrastructure encrypted using the first session key.

31. A mobile equipment according to claim 27, said program code further comprising:

program code configuring said mobile equipment to authenticate the subscription with a symmetric authentication procedure using a secret key stored in a memory module and shared between the switching and management infrastructure.

32. A mobile equipment according to claim 27, said program code further comprising:

program code configuring said mobile equipment to authenticate its subscription with an asymmetric authentication procedure using the public and private keys of its own and of the switching and management infrastructure.

33. A mobile equipment according to claim 27, said program code further comprising program code configuring said mobile equipment to authenticate its subscription using as a random seed for an authentication algorithm a random seed generated by the switching and management infrastructure, encrypted with a secret key of the second subscriber module.

34. A mobile equipment according to claim 33, said program code further comprising:

program code configuring said mobile equipment to receive from the switching and management infrastructure a first random number, and the first random number encrypted with a key combination that prevents decrypting by the first subscriber module, the message being ciphered with the first session key;

program code configuring said mobile equipment to decrypt the message in the first subscriber module, and forward the first random number encrypted with a key combination that prevents decrypting by the first subscriber module to the second subscriber module.

35. A mobile equipment according to claim 27, said program code further comprising program code configuring said mobile equipment to receive an off-system key from the switching and management infrastructure; and program code configuring said mobile equipment to utilize the off-system key for mutual authentication or session key creation with the second subscriber module when the switching and management infrastructure is not available for authentication.

36. A detachable subscriber module, comprising:

an interface to a first subscriber module;

a control unit, the functions of the control unit being at least partially controlled by program code, said program code comprising;

program code configuring said detachable subscriber module to generate a second random number;

program code configuring said detachable subscriber module to receive from the first subscriber module a first random number encrypted by a switching and management infrastructure after successful authentication of the first subscriber module with a key combination that enables decrypting the first random number by said detachable subscriber module but prevents decrypting the first random number by the first subscriber module; and program code configuring said module to use the first random number to generate a session key for the communication between the first subscriber module and the second subscriber module on the basis of the first random number and a second random number.

37. A detachable subscriber module according to claim 36, said program code further comprising program code configuring said detachable subscriber module to send the second random number in an authentication message to the first subscriber module, the second random number being encrypted with a key combination that prevents decrypting by the first subscriber module.

38. A detachable subscriber module according to claim 36, said program code further comprising program code configuring said detachable subscriber module to authenticate its subscription with a symmetric authentication procedure using a secret key shared between the switching and management infrastructure.

39. A detachable subscriber module according to claim 36, said program code further comprising program code configuring said detachable subscriber module to authenticate its subscription with an asymmetric authentication procedure using the public and private keys of its own and of the switching and management infrastructure.

40. A detachable subscriber module according to claim 36, said program code further comprising:
program code configuring said detachable subscriber module to receive a random seed for an authentication algorithm, the random seed generated by the switching and management infrastructure, and
program code configuring said detachable subscriber module to encrypt the random seed with a secret key of the second subscriber module; and
program code configuring said detachable subscriber module to forward the encrypted random seed to the first subscriber module.

41. A detachable subscriber module according to claim 36, said program code further comprising:
program code configuring said detachable subscriber module to receive in the encrypted message with the first session key an integrity value that allows a recipient to check the integrity of the received first random number;
program code configuring said detachable subscriber module to include in the message comprising the first random number the integrity value.

42. A detachable subscriber module according to claim 36, said program code further comprising:
program code configuring said detachable subscriber module to receive an off-system key; and
program code configuring said detachable subscriber module to utilize the off-system key for mutual authentication or session key creation by the first and the second subscriber module when the switching and management infrastructure is not available for authentication.

43. A mobile station that comprises:
a mobile equipment comprising:
a first subscriber module;
an interface for a second subscriber module;
a control unit, the functions of the control unit being at least partially controlled by program code, said program code comprising
program code configuring said equipment to authenticate a subscription of the first subscriber module and the second subscriber module with the switching and management infrastructure; said program code comprising
program code configuring said equipment to generate a first session key for the transmissions between the switching and management infrastructure and the authenticated first subscriber module, and
program code configuring said equipment to acquire at authentication a random number;
program code configuring said equipment to use the random number to generate a second session key for transmissions between the first subscriber module and the second subscriber module, the second session key being accessible only to the first subscriber module and the second subscriber module that are successfully authenticated by the switching and management infrastructure; and
a detachable subscriber module comprising:
an interface to a first subscriber module, a control unit, the functions of the control unit being at least partially controlled by program code, said program code comprising
program code configuring said module to generate a second random number;
program code configuring said module to receive from the first subscriber module a first random number encrypted by a switching and management infrastructure after successful authentication of the first subscriber module with a key combination that enables decrypting the first random number by said module but prevents decrypting the first random number by the first subscriber module; and
program code configuring said module to use the first random number to generate a session key for the communication between the first subscriber module and the second subscriber module on the basis of the first random number and a second random number.

44. A communication system that comprises:
a switching and management infrastructure element, comprising
a memory module storing authentication keys and algorithms for authenticating a first and a second subscriber module;
a control unit, the functions of the control unit being at least partially controlled by program code, said program code comprising
program code configuring said element to link the first subscriber module and the second subscriber module to one mobile station;
program code configuring said element to authenticate a subscription of the first subscriber module and the second subscriber module,
program code configuring said element to generate a first session key for the transmissions between the switching and management infrastructure and the authenticated first subscriber module, and
program code configuring said element to acquire at authentication of at least one of the subscriber modules a random number; and
program code configuring said element to make the random number accessible to the other subscriber module, if the other subscriber module is successfully authenticated; and
a mobile station that comprises
a mobile equipment comprising
a first subscriber module;
an interface for a second subscriber module;
a control unit, the functions of the control unit being at least partially controlled by program code, said program code comprising
program code configuring said equipment to authenticate a subscription of the first subscriber module and the second subscriber module with the switching and management infrastructure; said program code comprising
program code configuring said equipment to generate a first session key for the transmissions between the switching and management infrastructure and the authenticated first subscriber module, and
program code configuring said equipment to acquire at authentication a random number;
program code configuring said equipment to use the random number to generate a second session key for transmissions between the first subscriber module and the second subscriber module, the second session key being accessible only to the first subscriber module and the second subscriber module that are successfully authenticated by the switching and management infrastructure; and a detachable subscriber module comprising
an interface to a first subscriber module, a control unit, the functions of the control unit being at least partially controlled by program code, said program code comprising
program code configuring said module to generate a second random number;
program code configuring said module to receive from the first subscriber module a first random number encrypted by a switching and management infrastructure after successful authentication of the first subscriber module with a key combination that enables decrypting the first random number by said module but prevents decrypting the first random number by the first subscriber module; and
program code configuring said module to use the first random number to generate a session key for the communication between the first subscriber module and the second subscriber module on the basis of the first random number and a second random number.

45. A non-transitory computer-readable medium having stored thereon a computer process for authenticating a mobile station of a communication system comprising a switching and management infrastructure, and a mobile station, the process comprising:

including in the mobile station a first subscriber module and a second subscriber module;

authenticating a subscription of the first subscriber module and the second subscriber module by the switching and management infrastructure;

generating a first session key for the transmissions between the switching and management infrastructure and the authenticated first subscriber module, and generating at authentication a random number that becomes accessible to the first subscriber module and the second subscriber module after successful authentication of the first subscriber module and the second subscriber module;

using the random number to generate a second session key for transmissions between the first subscriber module and the second subscriber module, the second session key being accessible only to the first subscriber module and the second subscriber module that are successfully authenticated by the switching and management infrastructure.

46. A non-transitory computer-readable medium of claim 45, comprising a computer readable medium, a program storage medium, a record medium, a computer readable memory, a computer readable software distribution package, or a computer readable compressed software package.

* * * * *